April 29, 1958     O. GARAPOLO     2,832,435
HYDRAULIC LIFT TRUCK
Filed April 22, 1952     3 Sheets-Sheet 1
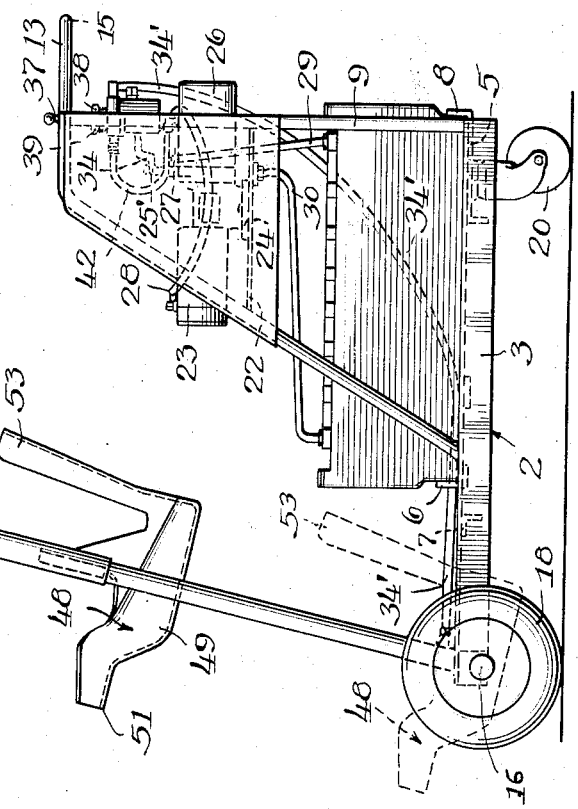
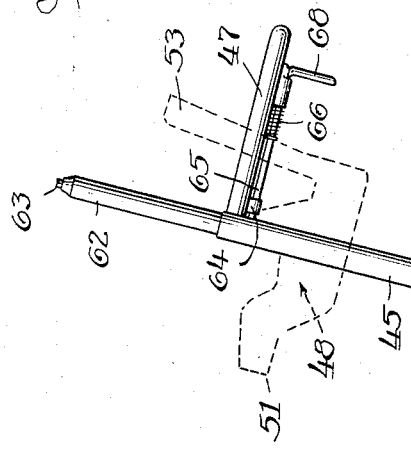
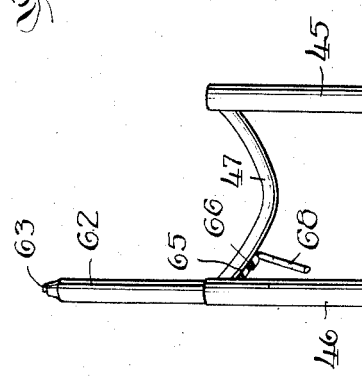
Inventor,
Orlando Garapolo,
By: Schneider & Dressler, Attys.

April 29, 1958  O. GARAPOLO  2,832,435
HYDRAULIC LIFT TRUCK
Filed April 22, 1952  3 Sheets-Sheet 2

Inventor,
Orlando Garapolo,
By: Schneider & Dressler, Attys.

April 29, 1958     O. GARAPOLO     2,832,435
HYDRAULIC LIFT TRUCK
Filed April 22, 1952     3 Sheets-Sheet 3
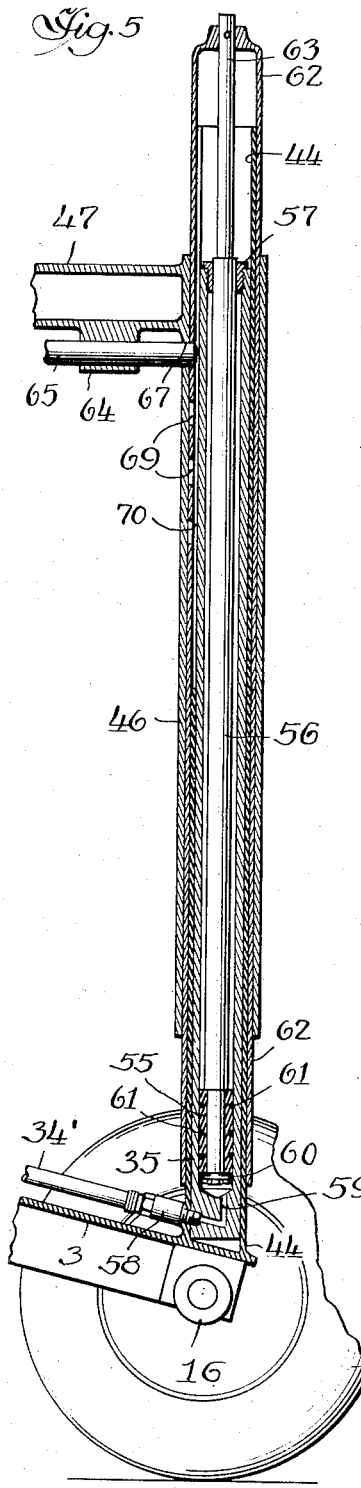
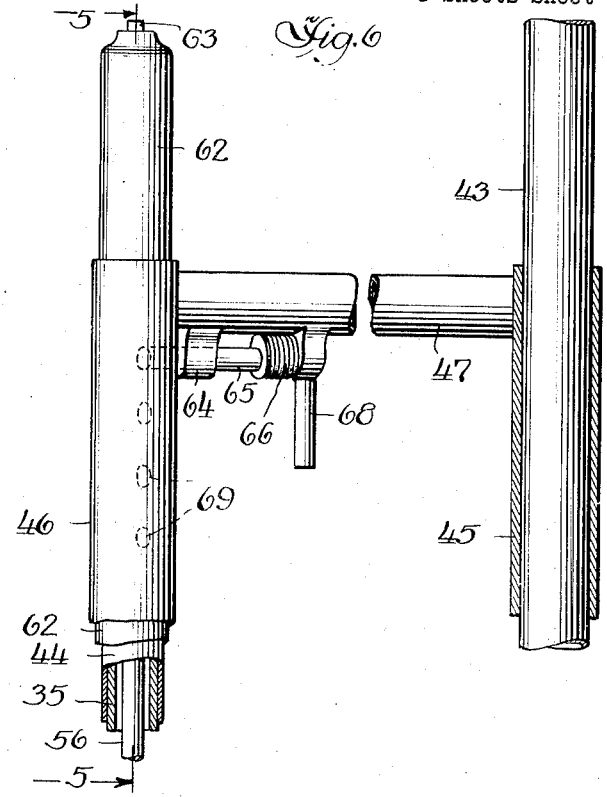
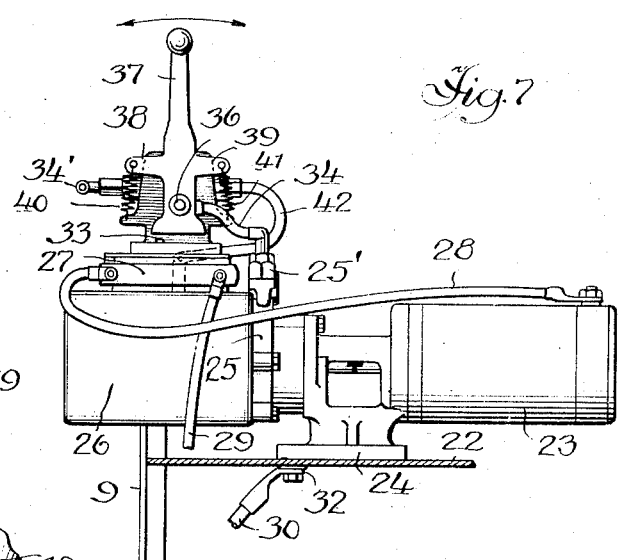
Inventor,
Orlando Garapolo,
By: Schneider & Dressler, Attys.

United States Patent Office 2,832,435
Patented Apr. 29, 1958

2,832,435

HYDRAULIC LIFT TRUCK

Orlando Garapolo, Chicago, Ill., assignor to Wilson & Co., Inc., a corporation of Delaware Application April 22, 1952, Serial No. 283,629

4 Claims. (Cl. 187—10)

This invention relates to a hydraulic lift truck for facilitating the handling of hind quarters and fore quarters of beef and the loading of such quarters of beef into freight cars or trailer trucks and the unloading of the same therefrom.

It has been customary in the meat packing business to employ "beef luggers" to carry or lug hind quarters and fore quarters of beef from the loading area into the freight car or trailer truck where they are separately impaled on hooks suspended on transverse bars supported adjacent to the roof of the vehicle. Because quarters of beef weigh as much as 250 pounds and over, it requires the employment of men of extraordinary strength to lug or carry the quarters of beef into the freight car or truck and to unload the same therefrom.

It has become increasingly difficult to secure the employment of men of sufficient strength and stature to qualify as "beef luggers." With the hydraulic lift truck not only may persons of average strength be used to load and unload quarters of beef, but the loading and unloading operations are speeded up, thereby reducing the costs of this operation.

The hydraulic lift truck illustrated in the accompanying drawings is designed specifically for handling quarters of beef around a packing house, but it is obvious that the same advantages may be attained with a similar truck having a modified load-carrying structure for handling heavy loads of other materials.

The structure by which the above and other advantages of the invention are attained will be described in the following specification, taken in conjunction with the accompanying drawings, showing a preferred illustrative embodiment of the invention, in which:

Figure 1 is a side elevational view of a truck embodying the invention;

Fig. 2 is a front elevational view of the truck shown in Fig. 1;

Fig. 5 is a fragmentary cross sectional view through one post of the frame, taken substantially along the line 5—5, showing the hydraulic piston structure for raising and lowering the load-carrying pan.

Fig. 6 is a fragmentary view, partly in elevation and partly in section, showing the means for holding the load-carrying pan in any vertical position; and Fig. 7 is a side elevational view showing the motor and hydraulic system for raising and lowering the load-carrying pan.

Figures 3, 4:
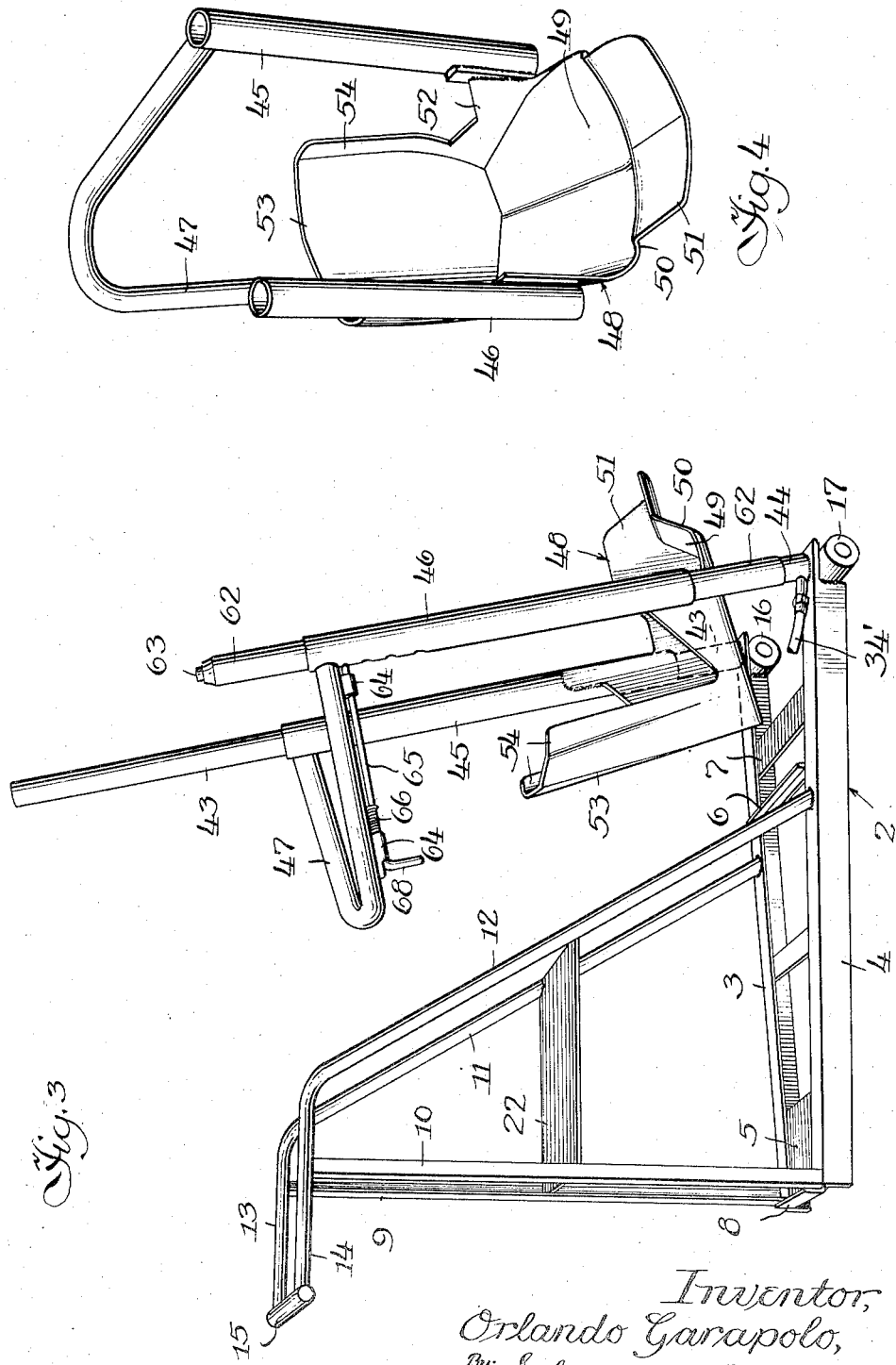
Fig. 3 is a perspective view of the truck frame with the motor and hydraulic system omitted to clarify the illustration.
Fig. 4 is a detail perspective view of the load-carrying pan.

Referring to Fig. 3 of the drawings, the frame comprises a base 2 consisting of a pair of angle irons 3 and 4 rigidly connected by transverse members 5, 6 and 7. The member 5 is in the form of a plate having one end turned up at the rear end of angle irons 3 and 4 to form a flange 8 which may be welded to a pair of upright angle irons 9 and 10. The lower ends of angle irons 9 and 10 rest on the angle irons 3 and 4, respectively, adjacent their rear edges, and are welded thereto. A pair of tubular steel members 11 and 12 are rigidly secured at one end to the angle irons 3 and 4, respectively, and extend upwardly and rearwardly therefrom. At a region forwardly of the upper ends of angle irons 9 and 10 the upper portions 13 and 14 of tubular members 11 and 12 are bent to extend rearwardly in a horizontal plane. The horizontal portions 13 and 14 are welded to the upper ends of angle irons 9 and 10, respectively, and extend rearwardly thereof. A cross piece 15 secured to the upper ends of tubular members 11 and 12 serves as a handle for the truck.

A pair of bearings 16 and 17 are mounted adjacent the front end of angle irons 3 and 4, respectively. Wheels 18 and 19 are mounted on shafts rotatably supported in bearings 16 and 17. A pair of swiveled casters 20 are mounted adjacent the rear ends of angle irons 3 and 4. A battery 21 is supported on angle irons 3 and 4 and cross members 5 and 6. The battery is held against longitudinal shifting by the flange 8 and the upstanding flange of cross member 6. The lifting mechanism, hereinafter described, is supported on a horizontal plate 22 having its corners rigidly secured to angle irons 9 and 10 and tubular members 11 and 12 intermediate their height. The plate 22 also serves to reinforce the members to which it is secured.

As shown in Fig. 7, the lifting mechanism includes an electric motor 23 having its base 24 mounted on plate 22. A hydraulic pump 25 and a reservoir 26 are supported adjacent one end of the motor. A starting switch 27 is connected to the motor by a line 28 and to the battery by a lead 29. The other lead 30 of the battery is grounded to the frame, as indicated at 32. A button 33 on top of the starter box is depressed, in a manner hereinafter described, to actuate the starter switch and thereby start the motor to operate the pump. A line 34 extends from the pump 25 through a three-way valve (not shown) and a line 34' to the bottom of a hydraulic cylinder 35 (Fig. 5). The valve is controlled by a shaft 36 on which a lever 37 is mounted.

When the lever 37 is moved to the left, as seen in Fig. 7, the valve is opened to allow the fluid to flow from pump 25 through line 34 to the cylinder 35, and the end of the lever depresses button 33 to start the motor. The motor continues to run only as long as the button 33 is held in its depressed position. Arms 38 and 39 extending laterally from opposite sides of lever 37 each have one end of a tension spring 40 or 41 connected thereto. The other ends of springs 40 and 41 are secured to the frame so that whenever lever 37 is released the springs will pull it to its normal central position. The valve is closed when lever 37 is in its normal position so that the pressure of the fluid in the cylinder is maintained. When lever 37 is moved to the right, the valve is opened to allow the fluid to flow from the line 34' through a line 42 to the reservoir.

A pair of posts 43 and 44 is rigidly secured at one end to the forward end portion of angle irons 3 and 4 respectively, and extend upwardly therefrom in parallel relationship with a slight rearward inclination. Sleeves 45 and 46 are slidably mounted on posts 43 and 44, respectively, and are connected adjacent their upper ends by a U-shaped member 47. The member 47 has its ends rigidly secured to the sleeves 45 and 46 and extends rearwardly therefrom to provide a support for the upper end of a quarter of beef the lower end of which is positioned in a load-carrying pan 48. The load-carrying pan 48 is provided with a trough-shaped bottom 49 having its forward edge curved upwardly, as indicated at 50, and terminating in a forwardly extending lip 51. Side walls 52 extending upwardly from the bottom 49 are welded to the sleeves 45 and 46. The pan 48 is also provided with a back 53 which has side walls 54 bent forwardly from its lateral edges. The back 53 is inclined forwardly towards the rear of the truck and co-operates with the U-shaped member 47 to support the side of the quarter of beef supported on its bottom in the pan 48.

The post 43 is merely a fixed supporting guide for the sleeve 45 and may be hollow or solid, as desired. The post 44 is hollow, and the cylinder 35 is mounted therein. A piston 55, positioned in the cylinder 35, is secured to a piston rod 56 which extends upwardly to the upper end of the cylinder when the piston is positioned adjacent the lower end of the cylinder. The upper end of the piston rod 56 fits slidably within a sleeve 57 rigidly secured in the upper end of the cylinder. The line 34' is connected to a fixture 58 which extends through an opening in post 44 and is threaded into the bottom of cylinder 35. The fixture 58 communicates with a fluid passageway 59 through which fluid is forced from line 34' to raise the piston 55 and piston rod 56. The piston is provided with a leather cup 60 and a plurality of O-rings 61 to seal the space between it and the inner wall of the cylinder.

A tubular post 62 is slidably mounted between the outer surface of post 44 and the inner surface of sleeve 46 and has its upper end projecting above the upper end of post 44. A stud 63 secured at one end to the upper end of tubular post 62 depends within the open upper end of post 44 and engages the upper end of piston rod 56. Accordingly, when the piston 55 and rod 56 are forced upwardly by the pressure of fluid entering cylinder 35 through the line 34' the tubular post 62 is also moved upwardly. The upper edge of piston 55 abuts the lower edge of sleeve 57 to limit the upward movement of the piston and the tubular post 62. When the piston reaches this position the cylinder 35 can not hold any more fluid. The pump is provided with a conventional relief valve which by-passes the cylinder and returns the excess fluid to the inlet side of the pump as long as the pump continues to operate.

The U-shaped member 47 is provided with a pair of spaced apertured lugs 64 through which a latch 65 extends. A spring 66 normally impels the latch 65 forwardly into contact with an aperture 67 provided therefor in sleeve 46. The opposite end of the latch 65 is bent downwardly to form a handle portion 68 so that the latch can be retracted against the action of spring 66. The post 62 is provided with a series of spaced apertures 69 aligned longitudinally with the aperture 67, and is adapted to receive the end of latch 65 when any one of the apertures 69 is aligned vertically with aperture 67. The upper portion of post 44 is provided with a slot 70 to provide clearance for the end of latch 65 which projects through aperture 67 and one of the apertures 69. When the latch 65 is retracted, the U-shaped member 47 and sleeves 45 and 46 may be moved vertically, relative to posts 43 and 44, to adjust the load-carrying pan 48 at any desired height within the limits provided by the series of apertures 69. Release of the handle 68 allows the spring 66 to move the latch 65 into latching position with the aligned aperture 69.

Upward movement of post 62 carries the U-shaped member 47 and the pan 48 upwardly with it when the latch 65 is latched into engagement with one of the apertures 69. Since the vertical travel of the pan 48 is limited by the length of the cylinder 35, the vertical adjustment of the pan by means of the engagement of latch 65 with apertures 69 prior to the loading of the beef into pan 48 determines the final elevation to which the beef may be raised hydraulically.

In the operation of the truck, the vertical position of the load-carrying pan is adjusted and is generally not changed until the truck is to be used for a different transporting operation where the desired load elevations may be different. The quarter of beef is loaded into the pan 48 and the truck is pushed to the unloading area. If the loading and unloading positions are at different elevations relative to the floor the operator may raise or lower the pan 48 hydraulically to the level desired so that the beef does not have to be lifted or dropped at either end of the transporting operation.

While I have described a preferred embodiment of the invention in considerable detail, it will be understood that the description thereof is intended to be illustrative, rather than restrictive, as many details may be modified or changed without departing from the spirit or scope of the invention. Accordingly, I do not desire to be restricted to the exact structure described.

I claim:

1. A hydraulic lift truck comprising a base, a pair of upwardly extending posts rigidly secured to said base, a sleeve slidably mounted on each of said posts, a load-carrying pan rigidly secured at opposite sides to said sleeves, a U-shaped member rigidly secured to said sleeves, said U-shaped member being positioned above said load-carrying pan whereby it may cooperate therewith to provide lateral support for a load carried by said pan, a tubular post slidably mounted between one of said pair of posts and the sleeve mounted thereon, a latch mounted on said U-shaped member and engageable with said tubular post to hold said tubular post and said sleeves from relative movement, a hydraulic cylinder mounted in said one of said pair of upwardly extending posts, a piston and piston rod movably mounted in said cylinder and operatively connected to said tubular post, whereby longitudinal movement of said piston and piston rod in said cylinder moves both of said sleeves and said load-carrying pan therewith, and a hydraulic system mounted on said truck and operatively connected to said cylinder, said hydraulic system being operative to force fluid into said cylinder under pressure to lift said load-carrying pan relative to said pair of upwardly extending posts.

2. A hydraulic lift truck comprising a base, a pair of upwardly extending posts rigidly secured to said base, a sleeve slidably mounted on each of said posts, a load-carrying pan rigidly secured at opposite side to said sleeves, a U-shaped member rigidly secured to said sleeves above said pan whereby it may cooperate with said pan to help support the upper portion of a load carried by said pan, a tubular post slidably mounted between one of said pair of upwardly extending posts and the sleeve mounted thereon, a latch mounted on said U-shaped member and engageable with said tubular post to hold said tubular post and said sleeves from relative movement, a hydraulic cylinder mounted in said one of said pair of upwardly extending posts, a piston and piston rod movably mounted in said cylinder and operatively connected to said tubular post, whereby longitudinal movement of said piston and piston rod in said cylinder moves both of said sleeves and said load-carrying pan therewith, and a hydraulic system mounted on said truck and operatively connected to said cylinder, said hydraulic system including a three-way valve whereby fluid may be forced into said cylinder under pressure to lift said load-carrying pan relative to said pair of upwardly extending posts, retained in said cylinder to hold said load-carrying pan in any position, or released from said cylinder to allow said load-carrying pan to move downwardly relative to said pair of upwardly extending posts.

3. A hydraulic lift truck comprising a base, a pair of upstanding parallel posts rigidly secured to said base, a sleeve slidably mounted on each of said posts, a load-carrying pan movably mounted between said posts, said pan being secured to both of said sleeves, means for adjusting the vertical position of said load-carrying pan relative to said posts, a U-shaped member having its opposite ends connected to said sleeves above said pan to help support the upper portion of a load carried by said pan, means mounted on said U-shaped member for holding said pan in any adjusted vertical position, hydraulic lifting mechanism mounted in one of said posts and operatively connected to said load-carrying pan, and a motor and pump mounted on said truck, said motor and pump being operable to actuate said lifting mechanism whereby both of said sleeves and said load-carrying pan may be lifted relative to said posts.

4. A hydraulic lift truck comprising a base, a pair of upstanding parallel posts rigidly secured to said base, one of said posts being hollow, a tubular post slidably mounted on said hollow post, said tubular post having a series of longitudinally aligned apertures, a sleeve mounted on said tubular post, said sleeve having an aperture aligned longitudinally with the apertures of said tubular post, another sleeve slidably mounted on the other of said pair of upstanding parallel posts, a load-carrying pan secured to said sleeves, a U-shaped member secured to said sleeves above said load-carrying pan, a latch projecting through the aperture in said first mentioned sleeve and selectively engageable with the series of apertures in said tubular post to releasably hold said load-carrying pan in selective predetermined position relative to said tubular post, a hydraulic cylinder rigidly secured within said hollow post, a piston and piston rod movably mounted in said cylinder, a stud rigidly secured to said tubular post and axially aligned with said piston rod, said piston rod abutting said stud to move it and said tubular post upwardly when said piston rod is moved upwardly in its cylinder, and means mounted on said truck operable to move said piston rod relative to said cylinder, whereby said load-carrying pan is lifted relative to said pair of upstanding parallel posts.

References Cited in the file of this patent

UNITED STATES PATENTS

| | | |
|---|---|---|
| 1,015,393 | Murphy | Jan. 23, 1912 |
| 1,587,920 | Pixler | June 8, 1926 |
| 2,325,445 | Wagner | July 27, 1943 |
| 2,415,655 | Reinert | Feb. 11, 1947 |
| 2,431,096 | Van Den Bergh et al. | Nov. 18, 1947 |
| 2,463,381 | Hicks | Mar. 1, 1949 |
| 2,514,825 | Zenko | July 11, 1950 |
| 2,521,695 | Davis | Sept. 12, 1950 |
| 2,545,440 | Barber | Mar. 20, 1951 |
| 2,576,660 | Williams | Nov. 27, 1951 |